Aug. 16, 1938.   H. N. ATWOOD   2,126,711
COMPOSITE STRUCTURAL UNIT AND METHOD OF MAKING THE SAME
Filed Feb. 9, 1937
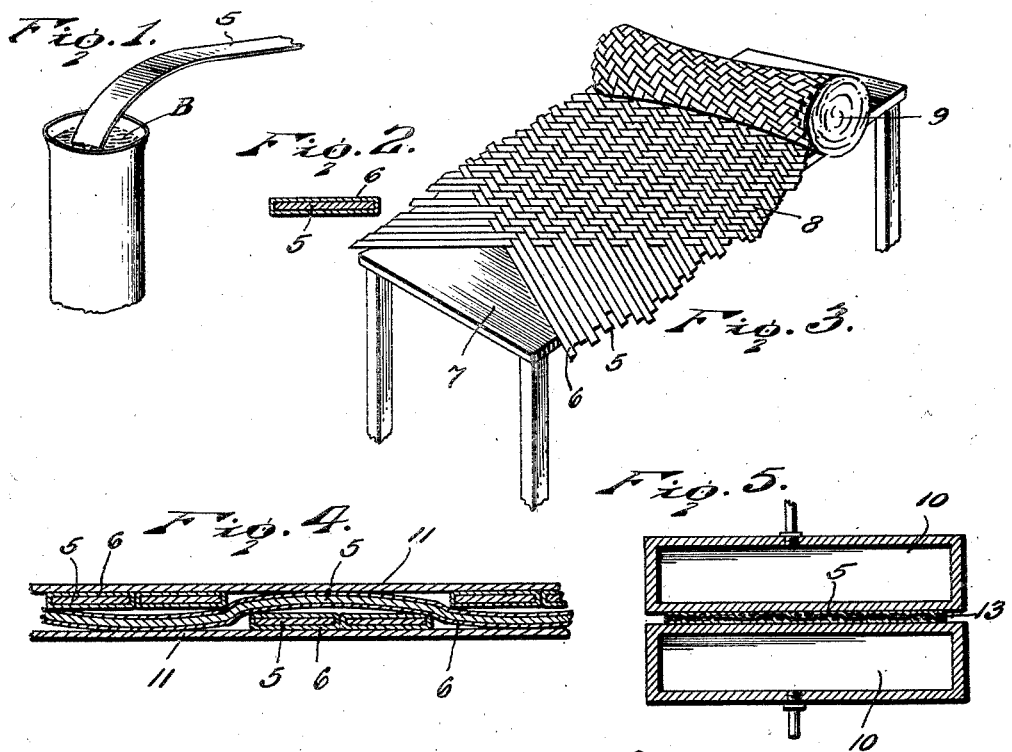
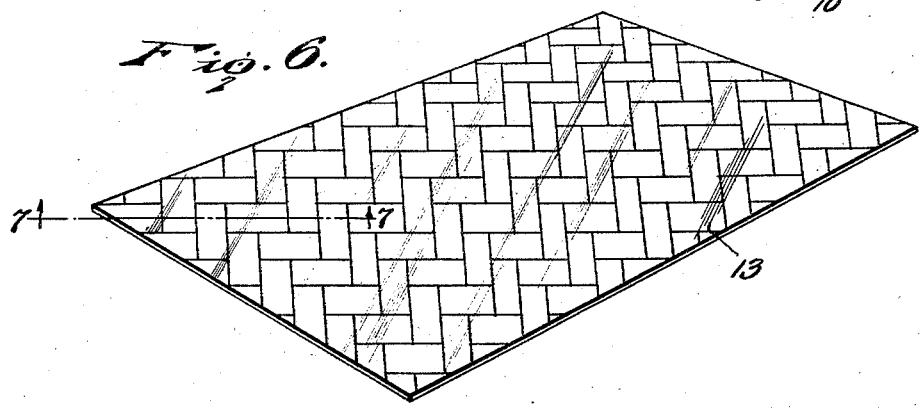
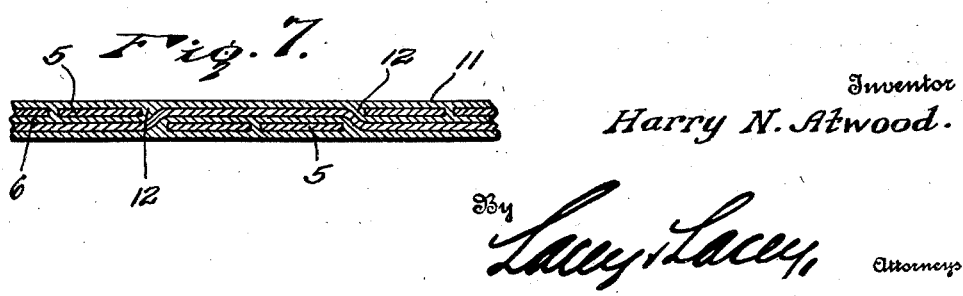
Inventor
Harry N. Atwood.
By Lacey & Lacey, Attorneys Patented Aug. 16, 1938

2,126,711

UNITED STATES PATENT OFFICE 2,126,711

COMPOSITE STRUCTURAL UNIT AND METHOD OF MAKING THE SAME

Harry N. Atwood, South Lyndeboro, N. H.

Application February 9, 1937, Serial No. 124,943

9 Claims. (Cl. 154—2)

This invention relates to composite structural units and method of making the same.

The object of the invention is to provide a structural unit having an internal reinforcing core of interwoven members and a body of thermoplastic material which contains, envelopes and integrates the core, thereby producing a structure possessing maximum strength and minimum weight, plus the properties of durability and permanency and rendering it particularly desirable in the construction of high-powered vehicles operating on land, water or in the air.

A further object of the invention is to provide the structural unit with a stiffening or reinforcing core of interwoven members, none of which members touch or make physical contact with adjacent members but are held in suspension apart from each other in an integrating medium of thermo-plastic material which serves as the body of the composite structure whereby a core of great rigidity and elasticity is provided in which the component members thereof cannot chafe or disintegrate.

A further object of the invention is to provide a composite structural unit embodying a core of interwoven members, all of which are hermetically sealed and suspended in a body of thermo-plastic material so that extraneous influences of moisture, atmosphere, electricity and light cannot penetrate the core and affect the same and thus produce a structural unit which will maintain its original properties and strength under all conditions of service.

A further object of the invention is to provide a structural unit, the reinforcing core of which is effectually protected from attacks by parasites, bacteria or the like and whereby rotting, decaying or disintegration of the reinforcing elements from germicidal action is effectually prevented.

A further object of the invention is to provide a composite structural unit, the component parts of which do not depend upon adhesion or bonding of layers or laminae of materials but derive their structural security and permanency by the interlocking, interweaving and encircling embrace of each component part relative to adjacent parts in a conglomerate but definitely suspended assemblage.

A still further object of the invention is to provide a novel method of treating the reinforcing strips or ribbons and weaving or interlocking said treated ribbons to form a flat interwoven panel and subjecting the woven panel to heat and pressure to integrate the parts and give the structure a permanent shape or set.

In the accompanying drawing forming a part of this specification and in which similar numerals of reference indicate corresponding parts in all the figures of the drawing:

Figure 1 is a perspective view of a portion of the tank containing liquid or semi-liquid thermoplastic material, one of the reinforcing strips or ribbons being shown partially immersed therein, Figure 2 is a transverse sectional view of one of the ribbons after being immersed in the thermoplastic material and showing how said thermoplastic material entirely envelopes the ribbon without impregating the fibers of wood.

Figure 3 is a perspective view showing the manner of weaving or interlocking the plasticized reinforcing strips or ribbons to form a panel or structural unit, Figure 4 is an enlarged transverse sectional view of the interwoven panel before being subjected to the action of heat and pressure, Figure 5 is a transverse sectional view showing one form of press which may be employed in the final treatment of the panel, Figure 6 is a perspective view of one of the complete panels, and Figure 7 is a detail transverse sectional view taken on the line 7—7 of Figure 6 showing how the reinforcing strips or ribbons are suspended within the thermo-plastic material and entirely encased and enveloped thereby.

In carrying the present invention into effect, I take thin strips or ribbons 5 of natural wood material, preferably mahogany, of any desired length, width and thickness, although I prefer that the ribbons be approximately one inch in width, and one forty-eighth of an inch in thickness to facilitate easy interweaving or interlocking of the ribbons in the manner hereinafter described. In actual practice, I have found that the best results are obtained when the wood strips or ribbons are in a dry or nearly dry condition prior to immersion within the plastic material. These wood strips or ribbons 5 are then immersed in or passed through a bath B of hot molten plastic material, such as semi-liquefied cellulose acetate thermo-plastic material and suitable means is provided whereby a definite substantial and uniform amount of the plastic material adheres to the superficial areas of the wood strips or ribbons without impregnation of the wood fibers to form thermo-plastic encasements 6. I have found it preferable to envelope the wood strips or ribbons with a covering of thermo-plastic material which is approximately, in wall thickness, one-half of the dimensional thickness of the wood ribbon upon which it is applied. Therefore, in the case of a wood ribbon of approximately one forty-eighth of an inch in thickness, I find it preferable to envelope said ribbon with a covering of thermo-plastic material of approximately twelve one-thousandths of an inch in thickness. I have also found it preferable to permit no portion of the reinforcing strip or ribbon to remain immersed in the thermo-plastic solution for a period longer than approximately thirty seconds, which length of time is sufficient to cause the plastic material to adhere to the surfaces of the wood ribbon without appreciable impregation into the wood structure and without causing the wood to scorch, burn or caramel. In other words, I do not impregnate the cells or pores of the natural wood with the thermo-plastic material nor do I disturb or materially alter the fibrous, cellular or porosic nature of the wood which in its natural state possesses strength-weight properties in the best ratio.

After the wood strips or ribbons have been passed through or immersed in the molten thermo-plastic bath, they are removed and allowed to cool for approximately one minute, thereby causing the thermo-plastic material enveloping the ribbons to become set or hardened. The plasticized strips or ribbons 5 are then placed on a suitable table or support 7 and braided, woven or interwoven into a fabric weave 8 of the desired dimensions, and this process of fabrication may be accomplished by any of the well-known braiding, weaving or fabric-making methods. It is preferred, however, to dispose the wood strips or ribbons diagonally of the support 7 and to weave or interlock said ribbons from opposite sides of the support as by so doing the resultant woven material 8 may be made in any desired length and the width of the woven structure is limited only by the lengths of the individual ribbons, as will be readily understood. As the strips 5 are interwoven or interlocked, the resultant fabricated structure 8 may be coiled or rolled on a suitable mandrel 9 and this operation continued until a roll of fabricated material of the desired length is obtained.

While I do not desire to limit myself to any particular style or type of ribbon weaving, it is preferred to pass the ends of the ribbons 5 on one side of the support 7 alternately under and over two of the ribbons or strips on the other side of the support whereby a strong close diagonal weave of the construction shown in Figure 6 of the drawing is obtained.

By reference to Figure 4 of the drawing, it will be noted that the woven structure comprises a lock-weave mesh of wood strips or ribbons, each ribbon being enveloped within a substantial thermo-plastic encasement, so that no wood surface comes into physical contact with any other wood surface but is separated, piece by piece, throughout the entire weave by two layers of thermo-plastic material, the combined thickness of the intervening thermo-plastic material being approximately the same as the dimensional thickness of the wood ribbons. The woven structure 8 is then cut or severed from the roll 9 in predetermined lengths, and said cut or severed lengths of woven material inserted between coacting pressing elements 10 and subjected to heat and pressure. Before inserting the woven structure between the pressing elements 10, it is preferred to cover the upper and lower surfaces of the woven material with a thermo-plastic material such as cellulose acetate, preferably in dry sheet form as indicated at 11 in Figure 4 of the drawing, so that, when the material is subjected to the action of heat and pressure not only will the plastic material encase the individual strips or ribbons 5 and thus hold said ribbons in suspension but said plastic encasements will become integrated and thoroughly bonded together. Moreover, when the sheets 11 are softened within the press 10, the cellulose acetate or other thermo-plastic material of which the sheets 11 are formed will flow evenly over the upper and lower surfaces of the woven structure and entirely fill the interstices between and around the interwoven ribbons, as indicated at 12 in Figure 7 of the drawing, and form a smooth hard casing entirely enveloping the structure whereby a panel 13 of the construction shown in Figure 6 of the drawing is produced.

By reference to Figure 4 of the drawing, it will be noted that, owing to the interweaving or interlocking of the wood ribbons constituting the core of the panel, said panel will be corrugated both longitudinally and transversely in cross section, thereby materially adding to the strength and durability of the panel as a structural unit. It will, furthermore, be noted that, when the interwoven structure is subjected to heat and pressure, the thermo-plastic material becomes semi-liquid to a degree and will unite, amalgamate and combine into an inseparable unit, but in uniting into an inseparable unit it does so without materially disturbing or changing the relative position or location of the interwoven wood ribbons because the volumetric contents of the thermo-plastic material is great enough to fill all interstices without materially altering the displacement of the entire mass. In other words, the interwoven wood ribbons are still enveloped in their original thickness of thermo-plastic material and are still prevented from coming in contact with each other and the cohesion or uniting of the thermo-plastic material has merely caused a suspension of all component elements and caused them to become permanently set within the integrated thermo-plastic material. Any type of press may be employed for effecting the cooking or curing of the material, but I prefer to use a pressure of approximately twenty pounds to the square inch of structural surface conjunctively with an induced body temperature of approximately three hundred and twenty degrees Fahrenheit, and this combined pressure and heat is applied for approximately ten minutes.

While the method of making the panel may be varied within the scope of the appended claims, in all instances the core elements will be strips or ribbons of wood or similar structural material, which strips or ribbons are first enveloped in a thermo-plastic material, as previously described, and the plasticized strips or ribbons then interwoven, the final operation of subjecting the material to heat and pressure in each instance serving to unite the thermo-plastic material into a unit mass. If a panel or composite structural unit of greater thickness than herein described is desired, it is preferable to increase the thickness of the wood ribbons and make the wall thickness of the thermo-plastic covering proportionately greater. That is to say, a wood thickness of one thirty-second of an inch should preferably have a thermo-plastic wall coating of approximately one sixty-fourth of an inch or a wood thickness of one sixteenth of an inch should have a wall thickness of thermo-plastic material of approximately one thirty-second of an inch, the method of fabricating or making the panel being the same in all cases. When making composite structural panels of greater thickness, it may be desirable to increase the time element of heat and pressure treatment to suit the individual case.

It is not desired to limit the invention to the structural nature of the strips or ribbons which comprise the interwoven core structure as any desired reinforcing strips may be interwoven to form a lock-weave core, which core is enveloped within a body of thermo-plastic material.

Neither is it desired to limit the invention to any specific type of thermo-plastic material as it is recognized that certain usages of structural material may demand a body of thermo-plastic material which may be harder or softer or of different chemical constituency than other bodies. It is, therefore, the intent of this invention that any thermo-plastic material which can be applied to the component parts of the structure so as to cause isolation, suspension and permanency of location thereof within an integral thermo-plastic body shall fall within the scope of the invention.

While I have found it preferable to use natural wood strips or ribbons in the fabrication of the woven core and have found it preferable to treat the wood strips or ribbons with a sealed covering of thermo-plastic material so that the thermo-plastic material does not penetrate the cells or pores of the wood, it is not intended that the invention shall be limited to the use of cellular or porous core ribbons as non-porous material may be used if desired. I have found it preferable, however, not to fill or impregnate the cells or pores with thermo-plastic material as I can obtain security of composition and integration without impregnation of the ribbons by means of the thermo-plastic encasements of said ribbons. I do find, however, that natural wood ribbons unimpregnated present a stronger and more desirable core than when they are impregnated because their strength-to-weight ratio has been retained.

Attention is here called to the fact that the great strength and elasticity of the interwoven core is due to the fact that each wood strip or ribbon in its final set-location of suspension actually takes the shape and form of a corrugated member, and this corrugation of the panel insures strength, rigidity and elasticity. It will further be noted that the isolation of the wood strips or ribbons one from another renders it impossible for said ribbons to move relative to each other or chafe, their suspension and integration within the thermo-plastic material being such as to permit them to flex and yield as a unit in conjunction with the thermo-plastic material.

Furthermore, I do not desire to limit the invention to any specific method of weaving or interweaving of the core members as I recognize that in certain cases biased weaving may offer advantages when applied to certain structures, whereas ninety degree weaving may offer advantages for other structures, etc., the salient feature of the invention residing in the lock-weave of the reinforcing ribbons or strips, which ribbons are individually encased in thermo-plastic material so as to hold the ribbons in suspension when subjected to heat and pressure.

Having thus described the invention, what is claimed as new is:

1. A structural material comprising a core of interwoven ribbons formed of thin strips of homogeneous relatively stiff form-retaining material, said strips being individually separated from each other by thermo-plastic material and the opposed faces of the core being covered with thermo-plastic material bonded to and homogeneous with the thermo-plastic material separating the ribbons.

2. A structural material comprising a core of interwoven ribbons formed of thin strips of homogeneous relatively stiff form-retaining material, and a body of thermo-plastic material having the core entirely embedded therein with a portion of the thermo-plastic material extending between and entirely separating the strips from each other and other portions forming coverings for the opposite faces of the core.

3. A structural material comprising a core of interwoven reinforcing ribbons formed of relatively thin strips of flexible form-retaining material, said ribbons being individually encased in thermo-plastic material, and a covering of thermo-plastic material disposed at opposite sides of the core and bonded to and homogeneous with the thermo-plastic coating of the ribbons.

4. A panel having a core formed of interwoven thin wooden strips of appreciable width, each strip being individually encased in a coating of thermo-plastic material, and the core being covered with thermo-plastic material disposed at opposite sides thereof and securely bonded to and homogeneous with the thermo-plastic material of the ribbons.

5. A structural material comprising a core formed of thin and relatively wide wood ribbons each encased in a coating of thermo-plastic material, certain ribbons extending under and over adjacent ribbons whereby the core will have the form of a woven mat corrugated longitudinally and transversely in cross section, and sheets of thermo-plastic material at opposite sides of the core bonded to the coating of the ribbons and filling the interstices between adjacent ribbons to form a homogeneous unit.

6. The method of making composite structural material which consists in coating relatively thin ribbons of flexible form-retaining material with cellulosic thermo-plastic material to entirely encase each ribbon with said material, allowing the coating material to dry, interweaving the coated ribbons to form a woven structure, covering the upper and lower surfaces of said woven structure with sheets of cellulosic thermo-plastic material, and subjecting the woven structure thus treated to the action of heat and pressure to integrally unite the parts and embed the interwoven ribbons in the cellulosic thermo-plastic material.

7. The method of making composite structural material which consists in coating relatively thin ribbons of form-retaining material with cellulosic thermo-plastic material to entirely encase each ribbon with said material, allowing the coating material to dry, interweaving the coated ribbons to form a woven structure, and subjecting the woven structure thus treated to the action of heat and pressure to integrally unite the parts and embed the interwoven ribbons in the cellulosic thermo-plastic material.

8. The method of making a composite structural panel which consists of coating thin natural wood strips of appreciable width with cellulose acetate so that each strip is individually and entirely surrounded with said cellulose acetate, allowing the cellulose acetate on the strips to dry, interweaving the coated ribbons to form a lock-weave mat of predetermined width and indefinite length, covering the upper and lower surfaces of the weave structure with sheets of cellulose acetate, and subjecting said woven mat with the sheets of cellulose acetate to the action of heat and pressure whereby to merge the sheets with the coatings of the strips and hold the individual strips in suspension within the cellulose acetate free of surface contact with each other and thoroughly bond the several component parts into an integrated homogeneous structure.

9. A structural material comprising a core formed of thin strips of form retaining material, certain of said strips being disposed transversely of other strips in interlocking engagement therewith, said strips being individually encased in and entirely separated from each other by thermo-plastic material, and the opposed faces of the core being covered with thermo-plastic material bonded to and homogeneous with the thermo-plastic material separating the strips.

HARRY N. ATWOOD.